(12) United States Patent
Shasha et al.

(10) Patent No.: US 12,253,904 B2
(45) Date of Patent: Mar. 18, 2025

(54) MACHINE LEARNING-BASED GENERATION OF SELF-HEALING POLICIES FOR ERROR MESSAGES ENCOUNTERED ON STORAGE SYSTEMS

(71) Applicant: Dell Products L.P., Round Rock, TX (US)

(72) Inventors: Osnat Shasha, Holon (IL); Shaul Dar, Petach Tikva (IL); Alex Kulakovsky, Ra'anana (IL)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 18/349,632

(22) Filed: Jul. 10, 2023

(65) Prior Publication Data
US 2025/0021419 A1    Jan. 16, 2025

(51) Int. Cl.
*G06F 11/00* (2006.01)
*G06F 11/07* (2006.01)

(52) U.S. Cl.
CPC ...... *G06F 11/0772* (2013.01); *G06F 11/0727* (2013.01); *G06F 11/0793* (2013.01)

(58) Field of Classification Search
CPC ............ G06F 11/0727; G06F 11/0772; G06F 11/0793
See application file for complete search history.

(56) References Cited

U.S. PATENT DOCUMENTS

| 11,481,310 | B1* | 10/2022 | Panchev | G06F 11/3664 |
| 2013/0055290 | A1* | 2/2013 | Gaikwad | G06F 11/1443 |
| | | | | 719/326 |
| 2013/0097130 | A1* | 4/2013 | Bingol | G06F 16/273 |
| | | | | 707/694 |
| 2014/0372805 | A1* | 12/2014 | Rijnders | G06Q 10/06311 |
| | | | | 714/37 |

(Continued)

OTHER PUBLICATIONS

L. Chen et al., "Decision Transformer: Reinforcement Learning via Sequence Modeling," 35th Conference on Neural Information Processing Systems, Dec. 2021, 14pages.

(Continued)

*Primary Examiner* — Joshua P Lottich
(74) *Attorney, Agent, or Firm* — Ryan, Mason & Lewis, LLP (57) ABSTRACT

An apparatus comprises a processing device configured to determine information characterizing one or more errors detected on a first one of a set of two or more storage systems, the determined information comprising a configuration of the first storage system, error messages associated with the detected errors, recovery actions taken on the first storage system in response to the error messages, and system state information for the first storage system before and after the recovery actions. The processing device is also configured to generate, utilizing one or more machine learning algorithms based at least in part on the determined information, at least one self-healing policy specifying at least one recovery action to take in response to at least one of the (Continued)

error messages. The processing device is further configured to provision the generated at least one self-healing policy in storage controllers of each of the two or more storage systems.

20 Claims, 7 Drawing Sheets

(56) References Cited

U.S. PATENT DOCUMENTS

| | | | | |
|---|---|---|---|---|
| 2016/0011950 | A1* | 1/2016 | Caradonna | G06F 11/2094 714/6.3 |
| 2016/0359923 | A1* | 12/2016 | Chen | G06N 20/00 |
| 2017/0091050 | A1* | 3/2017 | Mohammad | G06Q 30/02 |
| 2017/0134237 | A1* | 5/2017 | Yang | H04L 41/40 |
| 2020/0151060 | A1* | 5/2020 | Rinaldi | G06F 11/2048 |
| 2020/0151065 | A1* | 5/2020 | Rinaldi | G06F 11/2089 |
| 2020/0174972 | A1* | 6/2020 | Ranjan | G06F 11/0787 |
| 2021/0042180 | A1* | 2/2021 | Sutton | H02J 7/0042 |
| 2021/0349780 | A1* | 11/2021 | Ki | G06F 3/0619 |
| 2021/0349782 | A1* | 11/2021 | Ki | G06F 3/0634 |
| 2023/0118188 | A1* | 4/2023 | Arora | G06F 11/0709 714/4.1 |
| 2023/0195577 | A1* | 6/2023 | Darnell | G06F 11/2048 714/15 |
| 2023/0205647 | A1* | 6/2023 | Sharma | G06F 11/1464 714/15 |
| 2023/0281073 | A1* | 9/2023 | Shachar | G06N 5/025 714/25 |
| 2024/0070012 | A1* | 2/2024 | Baldassarre | G06F 11/2025 |

OTHER PUBLICATIONS

DELL/EMC, "The Integrated Dell Remote Access Controller 9 (IDRAC9) with Lifecycle Controller," Apr. 6, 2017, 6 pages.
DELL/EMC, "Integrated Dell Remote Access Controller 9 User's Guide," Rev. A02, Dec. 2020, 363 pages.
Redfish, "Redfish Specification," DSP0266, Version: 1.18.0, Apr. 4, 2023, 218 pages.
DMTF, "New PLDM White Paper Now Available," https://www.dmtf.org/content/new-pldm-white-paper-now-available, Jul. 6, 2023, 3 pages.

* cited by examiner

MACHINE LEARNING-BASED GENERATION OF SELF-HEALING POLICIES FOR ERROR MESSAGES ENCOUNTERED ON STORAGE SYSTEMS

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for machine learning-based generation of self-healing policies for error messages encountered on storage systems.

In one embodiment, an apparatus comprises at least one processing device comprising a processor coupled to a memory. The at least one processing device is configured to determine information characterizing one or more errors detected on a first one of a set of two or more storage systems, the determined information comprising a configuration of the first storage system, one or more error messages associated with the detected one or more errors, one or more recovery actions taken on the first storage system in response to the one or more error messages, and system state information for the first storage system before and after the one or more recovery actions. The at least one processing device is also configured to generate, utilizing one or more machine learning algorithms based at least in part on the determined information, at least one self-healing policy for at least one of the one or more error messages, the at least one self-healing policy specifying at least one recovery action to take in response to said at least one of the one or more error messages. The at least one processing device is further configured to provision the generated at least one self-healing policy in storage controllers of each of the two or more storage systems.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
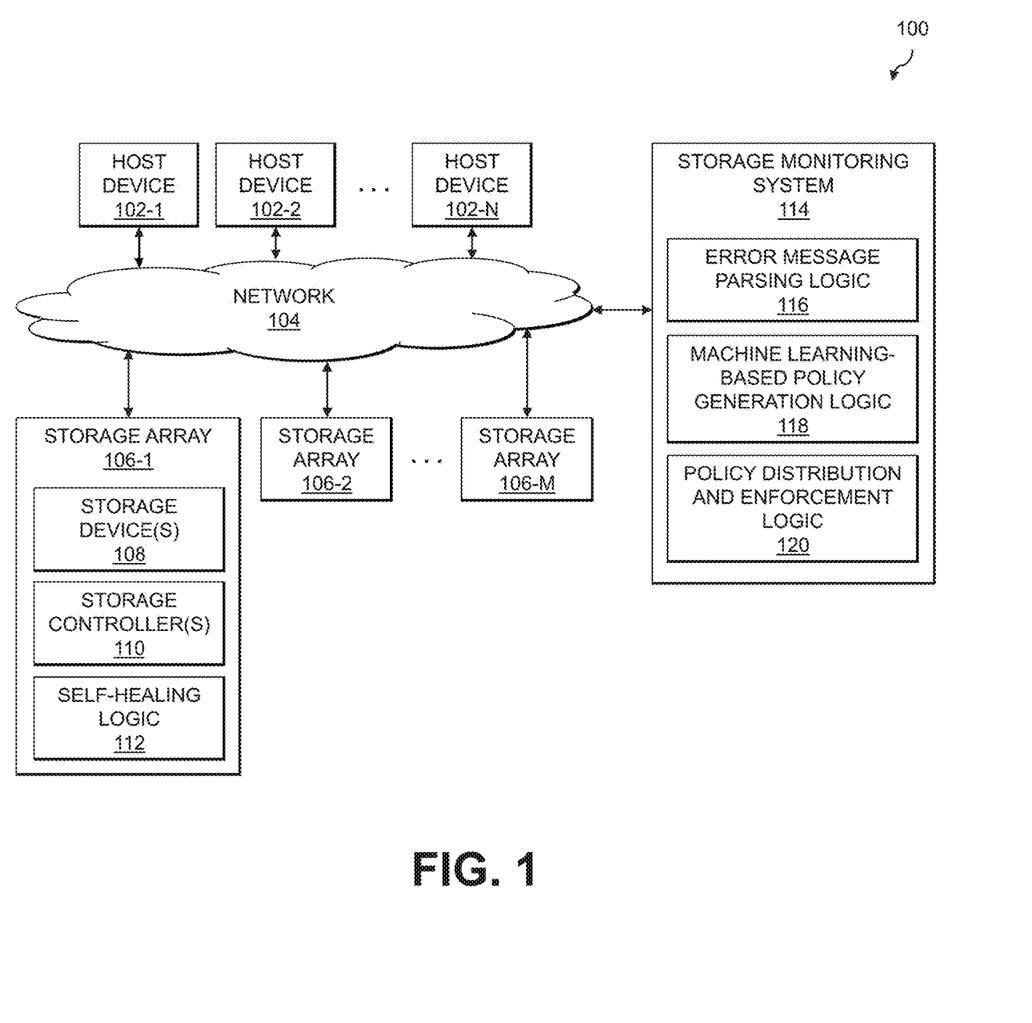
FIG. 1 is a block diagram of an information processing system configured for machine learning-based generation of self-healing policies for error messages encountered on storage systems in an illustrative embodiment.

FIG. 1 shows an information processing system 100 configured in accordance with an illustrative embodiment to provide functionality for machine learning-based generation of self-healing policies for error messages encountered on storage systems. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system. In some embodiments, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

At least one of the storage controllers of the storage arrays 106 (e.g., the storage controller 110 of storage array 106-1) is assumed to implement functionality for self-healing of its associated one of the storage arrays 106. Such functionality is provided via self-healing logic 112, which is configured to detect error messages raised by the storage controllers 110 (e.g., one or more baseboard management controllers (BMCs), one or more remote access controllers such as one or more instances of an Integrated Dell Remote Access Controller (iDRAC), etc.). If the error message is "known" (e.g., is associated with an existing self-healing policy specifying one or more corrective or self-healing actions to take), then the self-healing logic 112 applies the one or corrective or self-healing actions specified in one or more existing self-healing policies. If the error message is new or "unknown" (e.g., it is not associated with any existing self-healing policy), then the self-healing logic 112 may attempt a designated number of recovery actions in an attempt to improve the storage system health. The self-healing logic 112 may also upload or otherwise provide to a storage monitoring system 114 the new or unknown message and associated information (e.g., system configuration information and information related to the attempted recovery actions and system state before and after the attempted recovery actions).

The storage monitoring system 114 implements error message parsing logic 116, machine learning-based policy generation logic 118, and policy distribution and enforcement logic 120. The error message parsing logic 116 is configured to receive, from the self-healing logic 112 of the storage array 106-1 (and possibly other instances of self-healing logic implemented by other ones of the storage arrays 106-2 through 106-M), the new or known messages and associated information (e.g., system configuration information and information related to the attempted recovery actions and system state before and after the attempted recovery actions). The machine learning-based policy generation logic 118 analyzes such information using one or more machine learning algorithms in order to generate new or refined self-healing policies. The machine learning-based policy generation logic 118, in some embodiments, may implement a reinforcement learning (RL) framework utilizing a decision transformer (DT) architecture. The policy distribution and enforcement logic 120 is configured to distribute the new or refined self-healing policies to instances of the self-healing logic 112 on each of the storage arrays 106.

In some embodiments, the storage arrays 106 in the FIG. 1 embodiment provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

Although in the FIG. 1 embodiment the self-healing logic 112 is shown as being implemented internal to the storage array 106-1 and outside the storage controllers 110, in other embodiments the self-healing logic 112 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the self-healing logic 112. In addition, although the storage monitoring system 114 is shown as being implemented external to the storage arrays 106 and the host devices 102, this is not a requirement. The storage monitoring system 114, or one or more components thereof (e.g., the error message parsing logic 116, the machine learning-based policy generation logic 118, and the policy distribution and enforcement logic 120) may be implemented at least partially internal to one or more of the host devices 102 and/or one or more of the storage arrays 106.

At least portions of the functionality of the self-healing logic 112, the error message parsing logic 116, the machine learning-based policy generation logic 118, and the policy distribution and enforcement logic 120 may be implemented at least in part in the form of software that is stored in memory and executed by a processor.

The host devices 102, the storage arrays 106 and the storage monitoring system 114 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the storage monitoring system 114 may be implemented on respective distinct processing platforms, although numerous other arrangements are possible. For example, in some embodiments at least portions of one or more of the host devices 102, one or more of the storage arrays 106 and/or the storage monitoring system 114 are implemented on the same processing platform. One or more of the storage arrays 106 can therefore be implemented at least in part within at least one processing platform that implements at least a subset of the host devices 102 and/or the storage monitoring system 114.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system. The storage monitoring system 114 may also or alternatively be implemented as part of the cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the storage monitoring system 114 may be implemented at least in part in the first geographic location, the second geographic location, and one or more other geographic locations. Thus, it is possible in some implementations of the system 100 for different ones of the host devices 102, the storage arrays 106 and the storage monitoring system 114 to reside in different data centers.

Numerous other distributed implementations of the host devices 102, the storage arrays 106 and the storage monitoring system 114 are possible. Accordingly, the host devices 102, the storage arrays 106 and the storage monitoring system 114 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for machine learning-based generation of self-healing policies for error messages encountered on the storage arrays 106 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
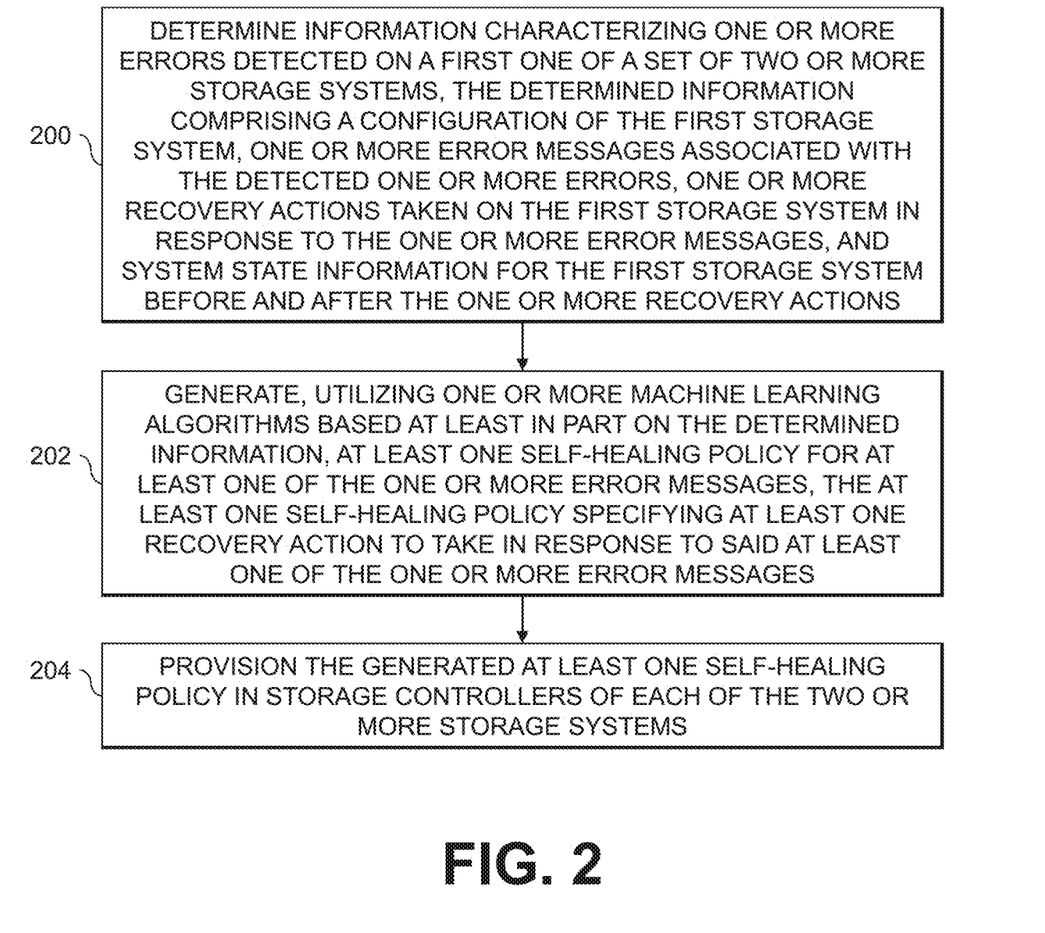
FIG. 2 is a flow diagram of an exemplary process for machine learning-based generation of self-healing policies for error messages encountered on storage systems in an illustrative embodiment.

An exemplary process for machine learning-based generation of self-healing policies for error messages encountered on storage systems will now be described in more detail with reference to the flow diagram of FIG. 2. It is to be understood that this particular process is only an example, and that additional or alternative processes for machine learning-based generation of self-healing policies for error messages encountered on storage systems may be used in other embodiments.

In this embodiment, the process includes steps 200 through 204. These steps are assumed to be performed by one or more of the self-healing logic 112, the error message parsing logic 116, the machine learning-based policy generation logic 118 and the policy distribution and enforcement logic 120. The process begins with step 200, determining information characterizing one or more errors detected on a first one of a set of two or more storage systems. The determined information comprises a configuration of the first storage system, one or more error messages associated with the one or more errors, one or more recovery actions taken on the first storage system in response to the one or more error messages, and system state information for the first storage system before and after the one or more recovery actions. In step 202, one or more machine learning algorithms are utilized to generate at least one self-healing policy for at least one of the one or more error messages based at least in part on the determined information. The at least one self-healing policy specifies at least one recovery action to take in response to said at least one of the one or more error messages. The generated at least one self-healing policy is provisioned in storage controllers of each of the two or more storage systems in step 204.

The storage controller of the first storage system is configured with one or more existing self-healing policies specifying one or more recovery actions to take in response to one or more known error messages. The one or more error messages associated with the one or more errors may comprise unknown error messages not associated with any of the one or more existing self-healing policies configured in the storage controller of the first storage system. The generated at least one self-healing policy may comprise a new self-healing policy, or a modification of a given one of the one or more existing self-healing policies configured in the storage controller of the first storage system. The one or more error messages associated with the one or more errors may comprise unknown error messages not associated with any existing self-healing policy provisioned in the storage controller of the first storage system.

The configuration of the first storage system may comprise a list of hardware and software components of the first storage system. The configuration of the first storage system may further comprise version information and update dates for each of the hardware and software components in the list. The system state information may comprise a vector of discrete properties characterizing health of the first storage system. The vector of discrete properties may comprise values characterizing one or more of: health of hardware or software components of the first storage system; drive path availability for one or more storage drives of the first storage system; whether specified alerts are detected; and whether one or more counters have crossed associated thresholds.

The one or more machine learning algorithms may comprise a reinforcement learning framework. The reinforcement learning framework may utilize a decision transformer architecture. The decision transformer architecture may be trained utilizing a random walk through one or more known sub-graphs characterizing transitions between system states as a result of corrective actions taken to bring storage systems from a starting state to a goal state. The reinforcement learning framework may utilize a reward determined based at least in part on a difference in a health of the first storage system determined by comparing the system state information before and after the one or more recovery actions to generate the at least one self-healing policy.

Storage systems may use baseboard management controllers (BMCs) or remote access controllers (e.g., Integrated Dell Remote Access Controller (iDRAC) instances) to manage storage servers and relevant hardware thereof using various protocols, including predefined protocols such as the Distributed Management Task Force (DMTF) Redfish standard. The DMTF Redfish standard is designed to deliver simple and secure management for various types of IT infrastructure, including converged infrastructure, hybrid IT infrastructure, software defined data centers (SDDCs), etc. These standards may use well-known schemes for reporting data.

Based on reported messages (e.g., from BMCs or other remote access controllers), a storage system's management entity (e.g., a separate storage monitoring system, a self-healing engine implemented by the storage system, etc.) can react by instructing various actions to be performed such as replacing storage systems or components thereof, rebooting storage systems, rebooting specific parts of storage systems, etc. The reported messages may comprise error messages, log messages, etc. Self-healing can be used to repair storage systems without manual intervention, and without posing a risk on running systems. For example, resetting the BMC (e.g., which is used for management and control but not for data/IO processing) may be performed without disrupting a running storage system. Self-healing may be performed based on reported messages (e.g., from BMCs or other remote access controllers), and has a goal of reducing repair costs in the field.

Over time, during the life span of a storage system, original equipment manufacturers (OEMs) that comply with certain standards (e.g., such as the DMTF Redfish standard) may add new messages to the data replies which help with failure analysis. The messages, for example, may indicate if an error is caused by faulty hardware, if the monitoring process itself failed due to faulty hardware (e.g., an I2C bus failure preventing monitoring of an end device), etc. New messages may be added as part of a storage system's regular firmware upgrades over time and, therefore, may indicate new causes for failures and errors that are not addressed by the storage system's existing management functionality. As a result, self-healing cannot be used because such new messages are not addressed by the self-healing logic implemented by the storage system's existing management functionality. This may result in excessive manual replacement of storage systems of components thereof by technicians, increasing field replacement costs (e.g., including dispatching support staff to replace parts) that are not justified (e.g., as self-healing measures could have solved at least some of such problems, if the self-healing logic were updated based on learning from the new messages).

Illustrative embodiments provide technical solutions which enable storage systems to address new messages (e.g., from BMCs or other remote access controllers implemented by storage appliances or other types of storage systems) that are not known and are therefore not handled by existing management functionality of the storage systems. The technical solutions are able to convert the new messages into new or revised policies with suitable associated corrective or self-healing actions.

Storage systems have a limited number of attempts to perform self-healing actions when a new message is reported without imposing a risk on the storage systems. These attempts are not part of the current self-healing logic that is live or otherwise enabled for the storage systems. The results of such attempts for performing self-healing are aggregated from storage systems in the field (e.g., in a unified database) and serve as input to one or more machine learning algorithms. The technical solutions are able to operate in two complementary scenarios, one in which online experiments are performed with different actions (e.g., "playing" with the system) and results are observed, and the other where there is only a limited subset of knowledge of how the storage systems react to certain actions. In some embodiments, the technical solutions use a reinforcement learning (RL) approach. The RL approach may utilize a decision transformer (DT) architecture as described in further detail below. Centralized machine learning-based logic (e.g., which may be hosted on a cloud computing system that implements a storage monitoring system for one or more storage systems) analyzes the available information (e.g., new or unknown messages, along with attempted corrective or self-healing actions performed by storage systems in response to the new or unknown messages and system state information before and after the corrective or self-healing actions were performed). The result is a new set of policies derived from the machine learning processing, with such new policies providing self-healing rules for newly-added messages each associated with one or more suitable corrective or self-healing actions. The new policies are then propagated to (or enforced on) all relevant storage systems.

The technical solutions described herein thus allow for "teaching" storage systems how to handle new errors without the need for version upgrades. This can advantageously greatly reduce the number of storage system replacements (or part replacements for storage systems) as well as system hotfix/upgrade installations. Through this, field replacement and maintenance costs may be reduced, along with downtime or other disruption.

The technical solutions described herein provide methods for continuously aggregating information from storage systems (or other types of IT assets) in the field in a unified database for machine learning processing. In some embodiments, a machine learning approach is used which learns from the configuration and state of storage systems (or other types of IT assets) as well as aggregated data about messages and actions taken in response thereto in order to derive new self-healing policies for specific error types. This may be modeled as a RL task, and some embodiments utilize a DT architecture to find optimal solutions to this task. There are different approaches for learning the new self-healing policies for specific error types, including an "online" approach and an "offline" approach. The online approach may be applied when there is an ability to run experiments online (e.g., when there is a complete and accurate simulation of the system). The offline approach may be applied when it is only possible to run a limited set of experiments and it is desired to generalize the knowledge subset which is currently known. The technical solutions are advantageously able to continuously propagate or enforce new or refined sets of self-healing policies for storage systems (or other types of IT assets), where the new or refined sets of self-healing policies are derived from the machine learning processing of data from all relevant storage systems (or other types of IT assets) in the field. This allows for "teaching" the storage systems (or other types of IT assets) how to handle new reported messages, each with a suitable set of corrective or self-healing actions, without the need to perform full version upgrades on the storage systems.

Figure 3:
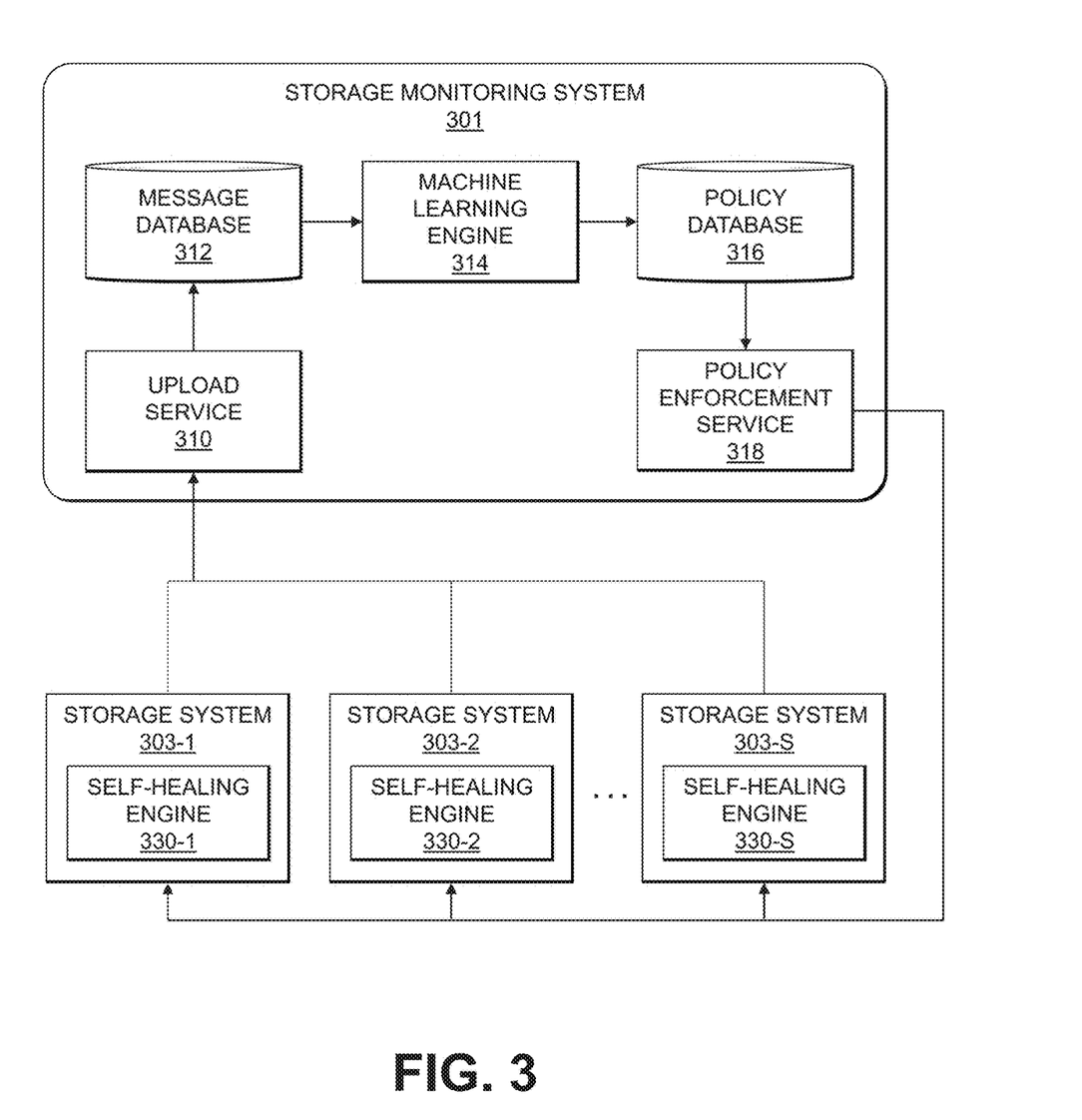
FIG. 3 shows a storage monitoring system configured to propagate and enforce self-healing policies for new or unknown error messages to a set of managed storage systems in an illustrative embodiment.

FIG. 3 shows a system 300 including a storage monitoring system 301 implementing an upload service 310, a message database 312, a machine learning engine 314, a policy database 316, and a policy enforcement service 318. The storage monitoring system 301 in the system 300 is responsible for propagating and enforcing corrective or self-healing policies for a set of storage systems 303-1, 303-2, . . . 303-S (collectively, storage systems 303). The storage systems 303 may also be referred to as storage appliances. Each of the storage systems 303-1, 303-2 . . . 303-S implements a self-healing engine 330-1, 330-2 . . . 330-S (collectively, self-healing engines 330). The self-healing engines 330 are configured to recover from specific error scenarios encountered on the storage systems 303. To do so, the self-healing engines 330 implement a set of corrective or self-healing policies which are propagated or enforced via the policy enforcement service 318 of the storage monitoring system 301. The self-healing engines 330 may also report, to the upload service 310 of the storage monitoring system 301, system configuration information and messages (e.g., error messages) which are generated by the storage systems 303. The system configuration for a given one of the storage systems 303 (e.g., storage system 303-1), may include a list of hardware and/or software modules (e.g., components, models, part numbers, etc. and their associated versions and update dates). The system configuration may also include relevant activities (e.g., as determined from log messages or other information) that occurred before recovery actions are taken (e.g., non-disruptive upgrade (NDU), firmware upgrade, field replacement unit (FRU), etc.), inventory data, etc. The self-healing engines 330 may select corrective actions to take on the storage systems 303 based at least in part on the system configuration information.

The messages may include OEM messages that comply, for example, with the DMTF Redfish standard. The messages are used to indicate an error that has been encountered on one of the storage systems 303, and includes information for failure analysis. In some cases, messages are generated in response to errors caused by faulty hardware. Some messages are handled by the self-healing engines 330 (e.g., which may be implemented as software running on the storage systems 303). Some of the messages may be unknown or new messages, which can be added as part of the storage systems 303 regular firmware upgrades and are not addressed by the storage systems 303 currently released self-healing engines 330. The self-healing engines 330 may be provisioned with a set of policies, which include corrective or self-healing actions to be taken for a set of known messages. Such corrective or self-healing actions may include various rules for automated actions or manual interventions (e.g., FRU actions, destructive reboot, etc.) to be taken.

The self-healing engines 330 may also implement policy agents for handling new or unknown messages, which execute a set of corrective or self-healing actions when new or unknown messages are detected. The policy agents may attempt different recovery actions until an issue is resolved, or until a threshold number of attempts (e.g., 3) have been used up. The recovery actions should not pose a risk to the storage systems 303 (e.g., the recovery actions should not make the system state worse or have an impact on ongoing system activities). Examples of recovery actions include, in response to a connection between two node BMCs in an expansion enclosure hanging: (1) resetting an I2C connecting the two node BMCs; (2) resetting a "non-complaining" one of the two node BMCs; and (3) resetting the "complaining" one of the two node BMCs (e.g., the one detecting the issue).

The system state or health of the storage systems 303 may be represented by vectors of discrete properties which are aggregated to represent a unique system state. For example, the discrete properties may represent the state of relevant sub-systems or components of the storage systems 303. In the following description, it is assumed for simplicity that the value of each property is 0 or 1, but this can be generalized to any desired set or range of values. The system state may thus be represented as:

$$s_i = (x_1, x_2, x_3, \ldots x_n)$$
$$\forall i \, x_i \in \{0, 1\}$$

A health score (HS) may be derived by summing all values in a system state vector. In particular, the system state before and after a corrective action was executed may be compared. The health state $HS(s_t) = \Sigma_{i=0}^{n} x_i$ is considered an improvement of $s_s$ if the health score of $s_t$ is higher than $s_s$, i.e., $HS(s_t) > HS(s_s)$. The system state vector for a fully healthy system is $s_0 = (1, 1, 1, 1, \ldots, 1)$. Examples of discrete properties of the storage systems 303 which may be represented in the system state vector include: relevant hardware component health (yes/no for healthy/unhealth), drive path availability (yes/no for available/not available), related alert (yes/no), relevant statistics or counters (e.g., crossed thresholds or not), etc. In some embodiments, the typical number of relevant sub-systems or components is ≤5.

The storage monitoring system 301 implements the upload service 310 to allow the storage systems 303 (e.g., via the self-healing engines 330) to upload new or unknown messages, system configuration information, and corrective actions taken in response to the new or unknown messages along with system state information before and after different corrective actions were executed. The upload service 310 stores such information in the message database 312. The machine learning engine 314 analyzes the information stored in the message database 312 to derive new or refined policies for handling the new or unknown messages, with such new or refined policies being stored in the policy database 316. The policy enforcement service 318 updates the self-healing engines 330 of the storage systems 303 in the field (e.g., in response to new or refined policy rules being pushed to the policy database 316 based on the results of the machine learning performed by the machine learning engine 314). The policy enforcement service 318 may continuously propagate or enforce the new or refined policies (derived from the machine learning processing by the machine learning engine 314) to all the storage systems 303.

The machine learning engine 314 of the storage monitoring system 301 may implement a RL framework which utilizes a DT architecture. The DT architectures addresses RL as a sequence modeling problem, and uses an autoregressive transformer to predict the next optimal action given the previous states, actions and rewards so that it maximizes some reward function. The DT architecture can advantageously outperform older and more complicated RL architectures, and has an ability to generalize from low amounts of data (e.g., known trajectories) which is important in particular for the offline scenario.

Figure 4:
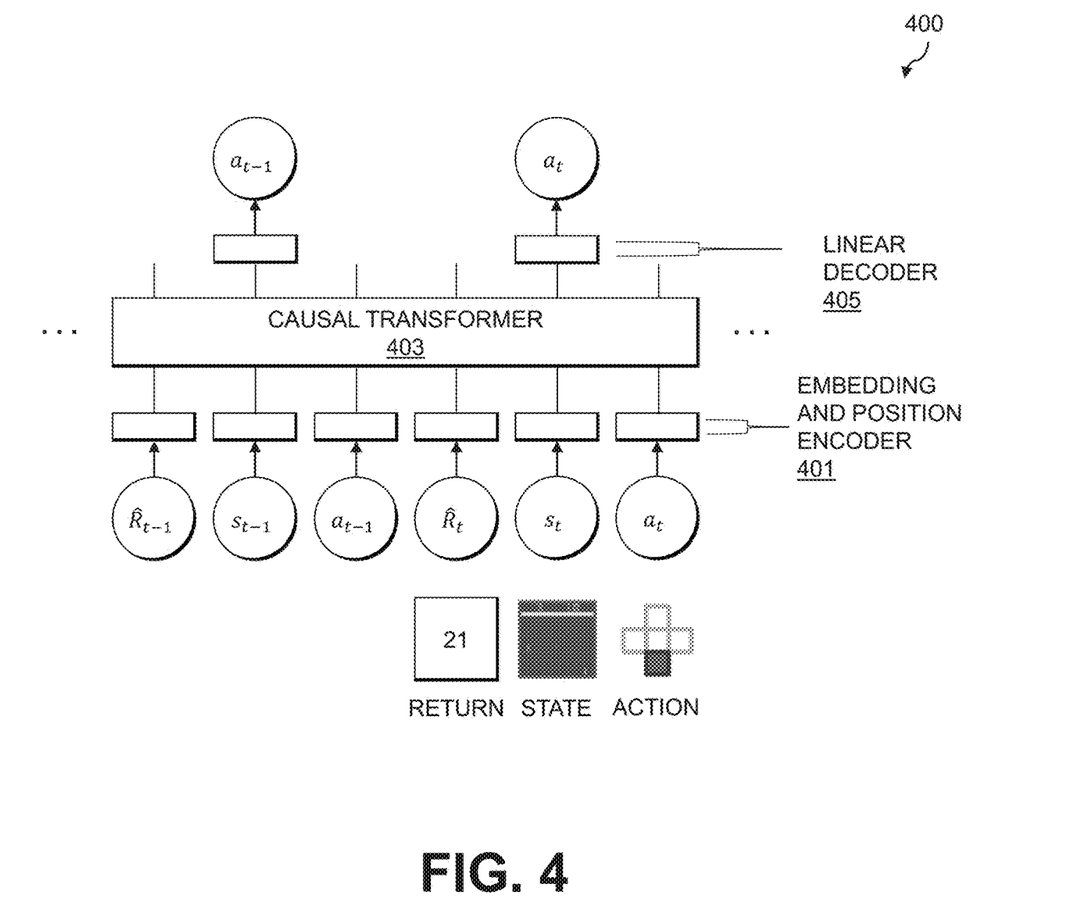
FIG. 4 shows a decision transformer architecture for a reinforcement learning framework in an illustrative embodiment.

FIG. 4 shows a DT architecture 400, which includes an embedding and position encoder 401, a causal transformer 403 and a linear decoder 405. The embedding and position encoder 401 takes as input sets of rewards (also referred to as returns), states and actions for times t−1, t, etc. The rewards or returns are denoted as $\hat{R}_{t-1}$, $\hat{R}_t$, etc. The states are denoted as $s_{t-1}$, $s_t$, etc. The actions are denoted as $a_{t-1}$, $a_t$, etc. The state is defined as the concatenation of the (mostly static) system configuration, the (dynamic) system state vector, and the last message received. The action is defined as a corrective action that transitions the system state from an initial state si to a final state sf. The reward or return is defined as $HS(s_f)$–$HS(s_i)$, which is the (possibly zero) improvement in the system health as a result of the action. In a given state, following the reception of a new or unknown message, the machine learning algorithm can attempt one or multiple moves or actions. In the one-move approach, the system attempts to perform the relevant corrective actions one at a time until the system state is improved or the maximum number of attempts is exhausted. In the multiple moves approach, the system can perform sequences of actions, and in general the order of the attempted actions may affect the result (e.g., the final state).

Figure 5:
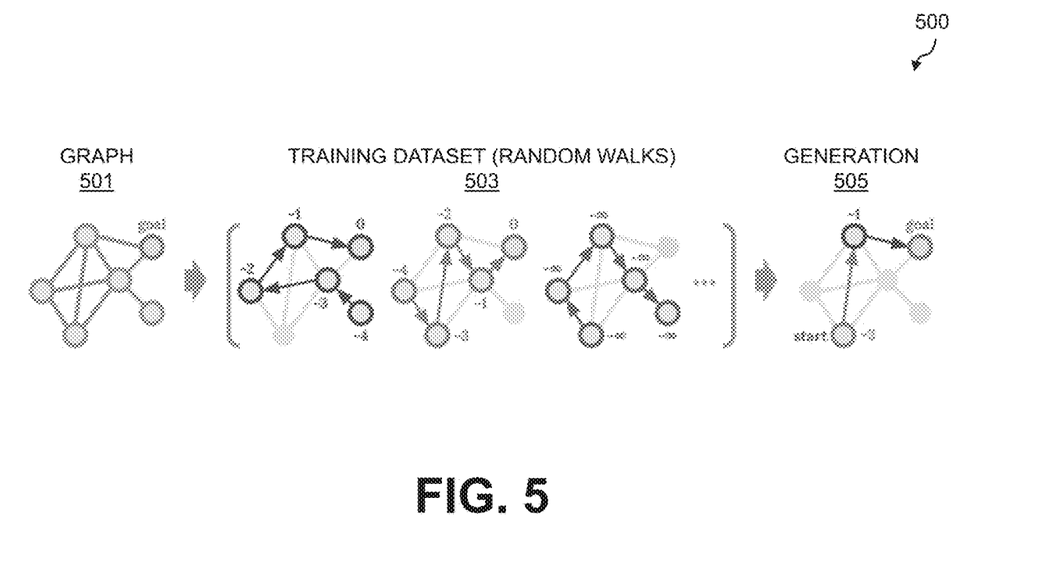
FIG. 5 shows training of a decision transformer architecture for a reinforcement learning framework in an illustrative embodiment.

As discussed above, the "online" approach is applicable when there is an ability to run experiments online (e.g., in RL terms, when the agent can interact with the environment). This is the case where there is a complete and accurate simulation of the system. In this case, a single corrective move or longer trajectories (e.g., sequences of corrective actions that will improve the system state as much as possible) may be looked at. For complex systems with many "moving parts" or components, the online scenario is unlikely to be available. The "offline" approach is applicable when only a limited set of experiments (e.g., offline RL) can be performed, and it is desired to generalize the subset of knowledge which is already possessed. The training dataset in this scenario may be generated from lab and quality assurance (QA) experiments as well as field reports. FIG. 5 shows an offline approach 500, where a graph 501 with only a subset of the trajectories is known. The training dataset 503 includes random walks through the graph 501 which help to find good moves or actions that will improve the system state. The result is generation 505 of a policy (e.g., a move/action or sequence of moves/actions which takes the system from the starting state to the end goal state). The goal of the DT algorithm is to generalize the subset of knowledge which is already known to find good moves/actions that will improve the system state. While it is possible to look for a sequence of moves/actions, given the uncertainty about the actual system behavior the probability of error will increase as the length of the sequence of moves/actions increases.

An auto-learning and self-healing process flow will now be described. One of the storage systems 303 (e.g., storage system 303-1) detects an unknown or new message, and its self-healing engine 330-1 executes a set of corrective actions. The upload service 310 of the storage monitoring system 301 gathers information from the storage systems 303-1, and stores the information in the message database 312. The machine learning engine 314 then analyzes the received data stored in the message database 312 and attempts to find the optimal corrective action for the unknown or new message. If such an action is found, it is stored as a new or refined policy in the policy database 316. The policy enforcement service 318 then updates the logic of the self-healing engines 330 of all of the relevant storage systems 303. In addition, feedback regarding the success rate of existing rules is recorded to gain confidence in the recommended policy rules (e.g., stored in the policy database 316).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based generation of self-healing policies for error messages encountered on storage systems will now be described in greater detail with reference to FIGS. 6 and 7. Although described in the context of system 100, these platforms may also be used to implement at least portions of other information processing systems in other embodiments.

Figure 6:
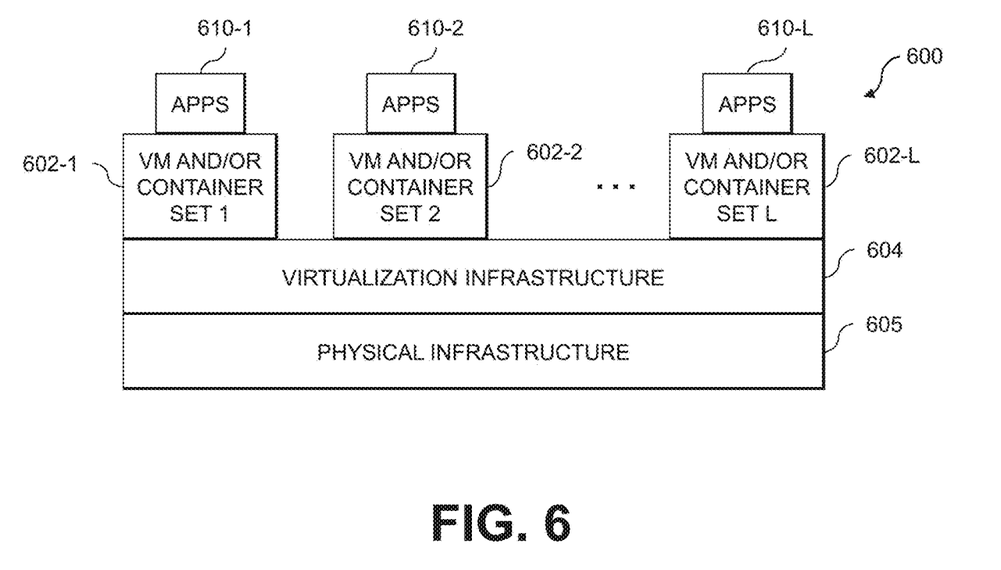
FIGS. 6 and 7 show examples of processing platforms that may be utilized to implement at least a portion of an information processing system in illustrative embodiments.
Figure 7:
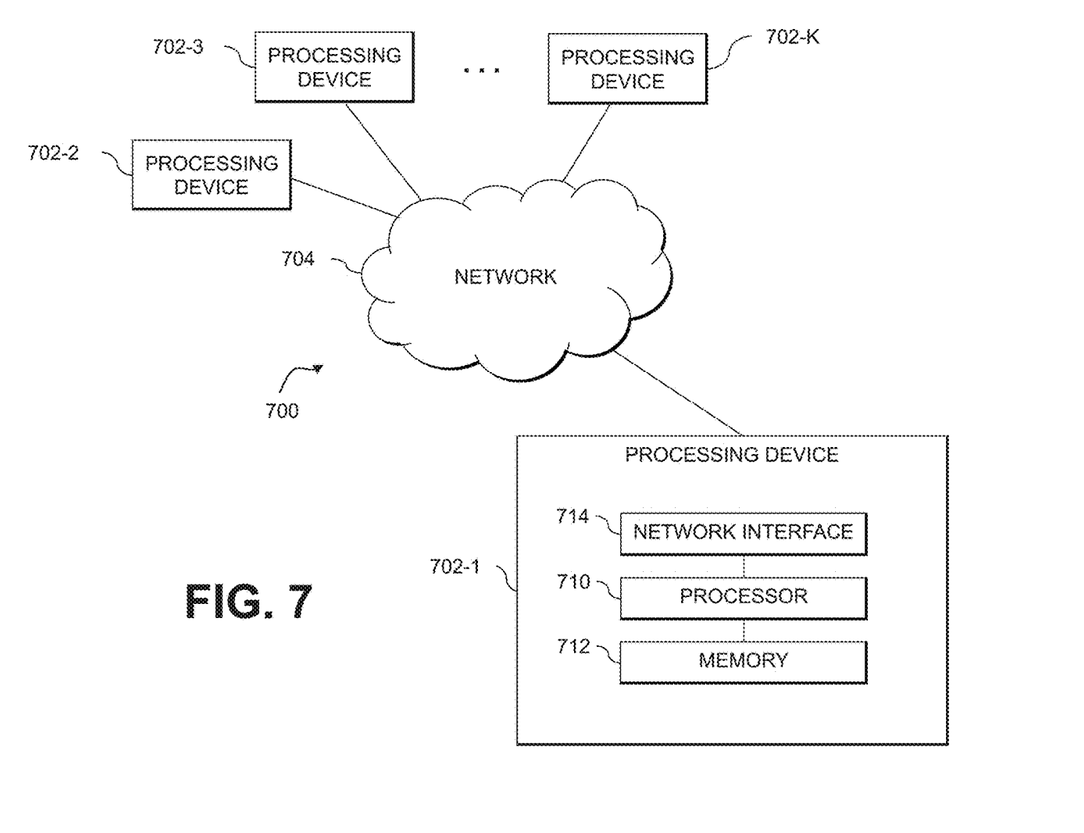

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 1304 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3 . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based generation of self-healing policies for error messages encountered on storage systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
      to determine information characterizing one or more errors detected on a first one of a set of two or more storage systems, the determined information comprising a configuration of the first storage system, one or more error messages associated with the detected one or more errors, one or more recovery actions taken on the first storage system in response to the one or more error messages, and system state information for the first storage system before and after the one or more recovery actions;
      to generate, utilizing one or more machine learning algorithms based at least in part on the determined information, at least one self-healing policy for at least one of the one or more error messages, the at least one self-healing policy specifying at least one recovery action to take in response to said at least one of the one or more error messages; and
      to provision the generated at least one self-healing policy in storage controllers of each of the two or more storage systems.

2. The apparatus of claim 1 wherein the storage controller of the first storage system is configured with one or more existing self-healing policies specifying one or more recovery actions to take in response to one or more known error messages.

3. The apparatus of claim 2 wherein the one or more error messages associated with the one or more errors comprise unknown error messages not associated with any of the one or more existing self-healing policies configured in the storage controller of the first storage system.

4. The apparatus of claim 2 wherein the generated at least one self-healing policy comprises a new self-healing policy.

5. The apparatus of claim 2 wherein the generated at least one self-healing policy comprises a modification of a given one of the one or more existing self-healing policies configured in the storage controller of the first storage system.

6. The apparatus of claim 1 wherein the one or more error messages associated with the one or more errors comprise unknown error messages not associated with any existing self-healing policy provisioned in the storage controller of the first storage system.

7. The apparatus of claim 1 wherein the configuration of the first storage system comprises a list of hardware and software components of the first storage system.

8. The apparatus of claim 7 wherein the configuration of the first storage system further comprises version information and update dates for each of the hardware and software components in the list.

9. The apparatus of claim 1 wherein the system state information comprises a vector of discrete properties characterizing health of the first storage system.

10. The apparatus of claim 9 wherein the vector of discrete properties comprises values characterizing one or more of:
health of hardware or software components of the first storage system;
drive path availability for one or more storage drives of the first storage system;
whether specified alerts are detected; and
whether one or more counters have crossed associated thresholds.

11. The apparatus of claim 1 wherein the one or more machine learning algorithms comprise a reinforcement learning framework.

12. The apparatus of claim 11 wherein the reinforcement learning framework utilizes a decision transformer architecture.

13. The apparatus of claim 12 wherein the decision transformer architecture is trained utilizing a random walk through one or more known sub-graphs characterizing transitions between system states as a result of corrective actions taken to bring storage systems from a starting state to a goal state.

14. The apparatus of claim 11 wherein the reinforcement learning framework utilizes a reward determined based at least in part on a difference in a health of the first storage system determined by comparing the system state information before and after the one or more recovery actions to generate the at least one self-healing policy.

15. A computer program product comprising a non-transitory processor-readable storage medium having stored therein program code of one or more software programs, wherein the program code when executed by at least one processing device causes the at least one processing device:
to determine information characterizing one or more errors detected on a first one of a set of two or more storage systems, the determined information comprising a configuration of the first storage system, one or more error messages associated with the detected one or more errors, one or more recovery actions taken on the first storage system in response to the one or more error messages, and system state information for the first storage system before and after the one or more recovery actions;
to generate, utilizing one or more machine learning algorithms based at least in part on the determined information, at least one self-healing policy for at least one of the one or more error messages, the at least one self-healing policy specifying at least one recovery action to take in response to said at least one of the one or more error messages; and
to provision the generated at least one self-healing policy in storage controllers of each of the two or more storage systems.

16. The computer program product of claim 15 wherein the storage controller of the first storage system is configured with one or more existing self-healing policies specifying one or more recovery actions to take in response to one or more known error messages, and wherein the one or more error messages associated with the one or more errors comprise unknown error messages not associated with any of the one or more existing self-healing policies configured in the storage controller of the first storage system.

17. The computer program product of claim 15 wherein the one or more machine learning algorithms comprise a reinforcement learning framework, the reinforcement learning framework utilizing a decision transformer architecture.

18. A method comprising:
determining to determine information characterizing one or more errors detected on a first one of a set of two or more storage systems, the determined information comprising a configuration of the first storage system, one or more error messages associated with the detected one or more errors, one or more recovery actions taken on the first storage system in response to the one or more error messages, and system state information for the first storage system before and after the one or more recovery actions;
generating, utilizing one or more machine learning algorithms based at least in part on the determined information, at least one self-healing policy for at least one of the one or more error messages, the at least one self-healing policy specifying at least one recovery action to take in response to said at least one of the one or more error messages; and
provisioning the generated at least one self-healing policy in storage controllers of each of the two or more storage systems;
wherein the method is performed by at least one processing device comprising a processor coupled to a memory.

19. The method of claim 18 wherein the storage controller of the first storage system is configured with one or more existing self-healing policies specifying one or more recovery actions to take in response to one or more known error messages, and wherein the one or more error messages associated with the one or more errors comprise unknown error messages not associated with any of the one or more existing self-healing policies configured in the storage controller of the first storage system.

20. The method of claim 18 wherein the one or more machine learning algorithms comprise a reinforcement learning framework, the reinforcement learning framework utilizing a decision transformer architecture.

* * * * *

UNITED STATES PATENT AND TRADEMARK OFFICE
CERTIFICATE OF CORRECTION

PATENT NO. : 12,253,904 B2
APPLICATION NO. : 18/349632
DATED : March 18, 2025
INVENTOR(S) : Osnat Shasha et al.

Page 1 of 1

It is certified that error appears in the above-identified patent and that said Letters Patent is hereby corrected as shown below:

In the Claims

Claim 18, Column 18, Line 21, please delete "to determine"

Signed and Sealed this
Twenty-second Day of April, 2025

Coke Morgan Stewart
*Acting Director of the United States Patent and Trademark Office*